G. R. BUTLER.
MANUFACTURE OF PICTURES.
APPLICATION FILED JUNE 27, 1910.
1,000,323.
Patented Aug. 8, 1911.
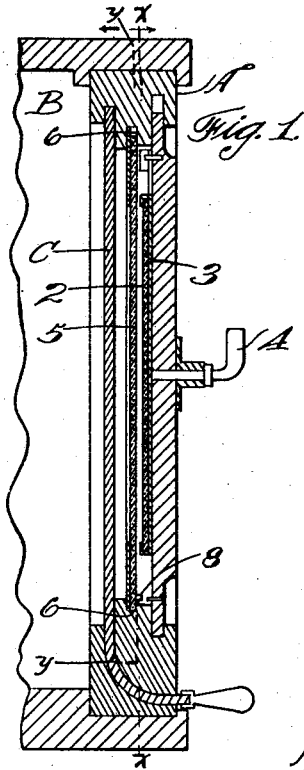
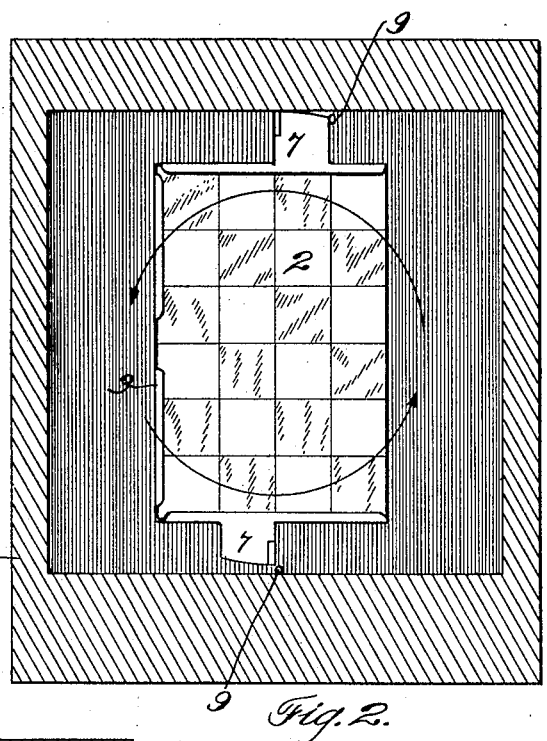
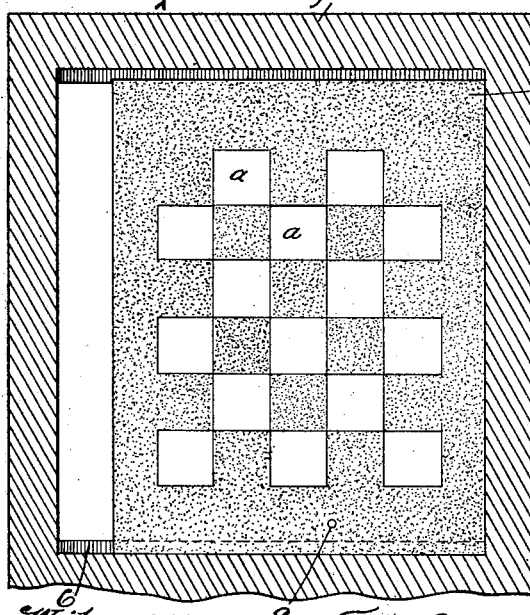
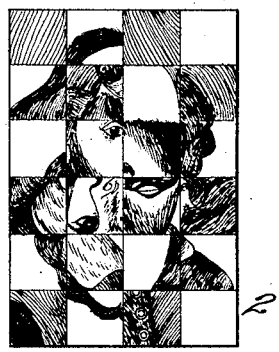
Witnesses:
F. E. Maynard
T. Hastberg
Inventor:
George R. Butler,
By G. H. Strong
his Atty.

UNITED STATES PATENT OFFICE.

GEORGE R. BUTLER, OF SAN FRANCISCO, CALIFORNIA.

MANUFACTURE OF PICTURES.

1,000,323.  Specification of Letters Patent.  Patented Aug. 8, 1911.

Application filed June 27, 1910. Serial No. 568,960.

*To all whom it may concern:*

Be it known that I, GEORGE R. BUTLER, a citizen of the United States, residing in the city and county of San Francisco and State of California, have invented new and useful Improvements in the Manufacture of Pictures, of which the following is a specification.

This invention relates to the art of picture making, and particularly pertains to puzzle pictures and means for producing the same.

It is an object of my invention to provide system of manufacturing comical or puzzle photographs or negatives; and to provide an apparatus whereby said pictures are readily, easily, and cheaply produced.

The invention consists of the parts and the construction and combination of parts as hereinafter more fully described and claimed, having reference to the accompanying drawing, in which—

Figure 1 is a central vertical section of a device used to aid the manufacture of the pictures. Fig. 2 is a section on line $x$—$x$ Fig. 1. Fig. 3 is a section on line $y$—$y$ Fig. 1. Fig. 4 is a plan view of a puzzle picture negative.

It is desirable to provide a simple, effective and inexpensive method of manufacturing unique and puzzling images of various persons, objects and animals. I have actually manufactured puzzle photographs by making a double exposure on a single plate, utilizing a checkered stop.

In manufacturing puzzle pictures I employ a suitable frame A adapted to fit into a camera B of any preferred style. The frame A is provided with a suitable slide C which may be withdrawn in the well-known manner so as to expose a sensitized medium, as plate 2. The plate 2 is removably mounted in a rotary holder or carrier 3 which is operable from the back of frame A, by a simple handle 4. Interposed between the usual lens of the camera and the plate 2 is a light stop 5 mounted slidably in groove 6 of frame A. The stop 5 is partially opaque and partially transparent. Preferably this transparent portion is checkered as at $a$, there being here shown six horizontal rows of quadrangles and five vertical rows. Their number, shape, and size are arbitrary.

The arrangement of the checkered sections is such that at one exposure of the contiguous sensitive plate 2 just one-half of its area is bared to the light rays, and this exposed area will be a duplicate in form of the checkered stop plate. Having exposed the plate, in part, if developed only a checkered image would appear over the plate and that portion which was covered by the opaque stop 5 would be clear. To complete the exposure of the entire area, the plate is turned up side down by means of the handle 4, and at the same time the stop member 5 is shifted to the other side of the frame A, a distance just equal to the width of a quadrangle $a$, whereby the opaque portion of the stop 5 now covers that portion of the plate which was previously exposed, and the transparent blocks register with the unexposed area of the plate 2. Now since the plate is turned upside down and the stop 5 has been shifted sidewise and the camera shutter again operated, the image formed on the plate will be readable opposite, or upside down to that first formed, thus producing a picture covering the entire area of the plate but divided into a number of even sections, those being diagonal to each other disclosing a normal image, all of one set of diagonal blocks being normal when the picture is held in one hand, while the remaining portion of the adjacent parallel block is inverted to the eye and only readable when the picture is turned end for end, see Fig. 4.

Any suitable means may be employed for shifting the latticed stop plate 5 and an arm 7 of the rotatable carrier 3, by engaging a lug 8 of the member 5 will effectually slide the stop 5 as the carrier 3 is just completing its turning motion.

Suitable stops 9 limit the movement of the carrier so that the checkered areas of the plate to be exposed will aline nicely.

Having thus described my invention, what I claim and desire to secure by Letters Patent is—

1. The method herein described of making photographs, said method consisting in simultaneously exposing numerous isolated portions of a sensitized medium to the action of light while stopping the light from the intermediate portions of said medium; then shifting the position of the medium; and then blocking out the light from the exposed portions of the medium and admitting light to the former unexposed intermediate portions of said medium.

2. The method herein described of making photographs, said method consisting in interposing a light-stop with transparent and opaque portions between the light and the sensitized surface of the photographic medium; then admitting light through the stop, whereby portions of the surface of the medium corresponding to the transparent portions of the stop are exposed; then reversing the medium substantially end for end so that unexposed portions of the medium are brought into register with transparent portions of the light-stop and exposed portions of the medium are brought into register with the opaque portions of said stop; and then making a second exposure.

3. The method of manufacturing photographs, which consists in first exposing alternate sections only of a sensitized medium to the light, and then turning the medium end for end and exposing the remaining areas.

4. The method herein described of making photographs, said method consisting in exposing a sensitized medium in conjunction with a stop having alternate transparent and opaque sections, and then reversing the medium and moving the stop to cover the previously exposed portions and exposing the remainder.

In testimony whereof I have hereunto set my hand in the presence of two subscribing witnesses.

GEORGE R. BUTLER.

Witnesses:
CHARLES A. PENFIELD,
G. H. STRONG.

Copies of this patent may be obtained for five cents each, by addressing the "Commissioner of Patents, Washington, D. C."